United States Patent [19]

Risberg

[11] Patent Number: 4,465,943
[45] Date of Patent: Aug. 14, 1984

[54] UNINTERRUPTED POWER SYSTEM WITH FREQUENCY AND PHASE CONTROL

[76] Inventor: Robert L. Risberg, 1810 S. Calhoun Rd., New Berlin, Wis. 53151

[21] Appl. No.: 489,904

[22] Filed: Apr. 29, 1983

[51] Int. Cl.$^3$ .................................................. H02J 9/06
[52] U.S. Cl. ........................................ 307/67; 307/127
[58] Field of Search ........................... 307/66, 67, 127; 290/4 A, 30 A

[56] References Cited

U.S. PATENT DOCUMENTS

| | | | |
|---|---|---|---|
| 3,050,635 | 8/1962 | Tunner | 307/64 |
| 3,665,495 | 5/1972 | Carter et al. | 307/67 |
| 4,054,818 | 10/1977 | Risberg | 363/138 X |
| 4,203,041 | 5/1980 | Sachs | 307/67 |

Primary Examiner—L. A. Goldberg
Assistant Examiner—Derek Jennings
Attorney, Agent, or Firm—Sughrue, Mion, Zinn, Macpeak and Seas

[57] ABSTRACT

An uninterrupted power source (UPS) system is provided by utilizing a synchronous motor to power an alternator which provides the desired uninterrupted output power. Normally, the synchronous motor is powered by utility line power. However, an interruption in utility power will cause the motor-alternator set to slow down, although the inertia of the system will continue generating power. If the utility power interruption is sufficient such that the alternator output frequency drops more than 1 Hz, or if reverse power flow is detected from the synchronizing motor back into the utility grid, the motor is automatically powered by an inverter driven from a battery-powered current source. A feedback system from the alternator output insures that the inverter is synchronized with the synchronous motor in order to quickly bring the alternator's output back up to the desired voltage and frequency level. A phase locked loop is utilized to bring the alternator output frequency into phase with a crystal oscillator generating a 60 Hz reference. Upon reapplication of utility line power, the inverter control system adjusts the phase of the motor alternator to the utility line power before reconnecting the motor directly to the utility power system, preventing large current and torque excursions and maintaining an extremely stable alternator output during any and all utility line power interruptions.

9 Claims, 11 Drawing Figures

FIG.1

FIG.2 — INVERTER, BATTERY, CHARGER

FIG. 3 – INVERTER CONTROL

FIG. 4 SPEED REGULATION CIRCUITRY

FIG. 10 – REVERSE POWER DETECT

FIG. 11

UNINTERRUPTED POWER SYSTEM WITH FREQUENCY AND PHASE CONTROL

BACKGROUND OF THE INVENTION

The present invention relates generally to systems for providing uninterrupted power in the event utility line power is interrupted and, specifically, to a system for avoiding transients when utility line power is lost or restored.

As the use of electronic equipment such as computers, word processors, printers, etc. becomes more widespread, increasing attention has been focused on the problem of what happens during a utility line power source failure. Such failure can be either a complete loss of power for extended periods of time, or can be a momentary "glitch" which may be a very short duration reduction in the voltage. In many installations, even such a short transient can result in a loss of stored information and/or the introduction of spurious signals into the system logic. Thus, it is desirable to provide an uninterruptable power source to completely preclude even momentary loss of power in the event of a utility line outage.

U.S. Pat. No. 3,050,635, issued to Tanner, on Aug. 21, 1962, describes an Uninterrupted Power Source (UPS) where power is normally supplied to a load by means of an AC motor-generator set. Upon failure of utility power, the AC motor-generator set is driven first by a DC motor powered by a battery and, additionally, by a diesel motor, if needed.

In U.S. Pat. No. 4,203,041, issued to Sachs on May 13, 1980, there is disclosed a battery powered generator set which provides an AC output to the load during the power outage. Sachs utilizes AC and DC machines, each capable of operation as a generator or a motor. During normal utility line operation, the AC machine operating as a motor coupled to the utility line drives the DC machine operating as a generator, which charges a battery power supply. Upon interruption of the utility power, the DC machine operates as a motor powered by the battery power supply, and turns the AC machine operating as an AC generator feeding the load.

The above are examples of motor-generator sets for the purpose of providing an uninterrupted power supply. Additionally, battery powered inverters are known which chop, transform, and filter a battery supply output to obtain an alternating current to provide uninterrupted power in the event of a utility line power outage. However, if the static inverter is operated continuously with the utility only feeding the battery, the inverter reliability itself becomes a problem.

One problem that must be overcome in any uninterrupted power supply system is a transient when the utility outage occurs, or is restored. Differences in phase between the utility line power and the UPS system power result in very high current peaks during reapplication of utility power. In the case of motor generator sets, this high current can result in severe torque disturbances.

SUMMARY OF THE INVENTION

It is therefore an object of the present invention to provide an uninterrupted power system for maintaining electrical power of a predetermined voltage, frequency, and phase during interruption of utility line power.

It is another object of the present invention to provide an uninterrupted power system for providing power of a predetermined voltage, frequency, and phase in order to avoid changes caused by disconnection and reconnection of the uninterrupted power system to the utility power system.

It is a further object of the present invention to provide a motor alternator system for providing power where the motor is normally driven by utility power but, during a utility power outage, is driven by a standby battery powered inverter.

It is a still further object of the present invention to provide an inverter control system for controlling power generated by a battery powered inverter so as to maintain a motor-driven alternator output within a specific voltage frequency and phase range upon disconnection/reconnection to the utility line.

The above and other objects are achieved in accordance with the present invention by providing an inverter control system which is responsive to the utility power condition, the existence of reverse power flow from the rotating UPS system into the utility power line, the actual alternator output, and the current load on the inverter. The inverter control system fires the switches contained in the inverter in the proper sequence to control the motor output shaft speed within a desired range such that the alternator driven by the motor produces an output having the required voltage frequency and phase. A phase locked loop in the control circuit compares the output phase with a reference signal and then adjusts the firing angle of the inverter and the duty cycle of the chopper to correct any errors. Additionally, a long-term speed trim signal is provided to sense and account for any changing of system components. The reference for the phase locked loop during standby operation and when power has just been reapplied, is derived from the utility line voltage. However, during a utility power outage, the reference is derived from a crystal controlled internal oscillator. Thus, the UPS system output is always very close to the desired frequency and phase, even during transitions between interruption and recommencement of utility line power.

BRIEF DESCRIPTION OF THE DRAWINGS

The specific nature of the invention, as well as other objects, aspects, uses and advantages thereof, will clearly appear from the following description and from the accompanying drawings, wherein.

DESCRIPTION OF THE PREFERRED EMBODIMENTS

Figure 1:
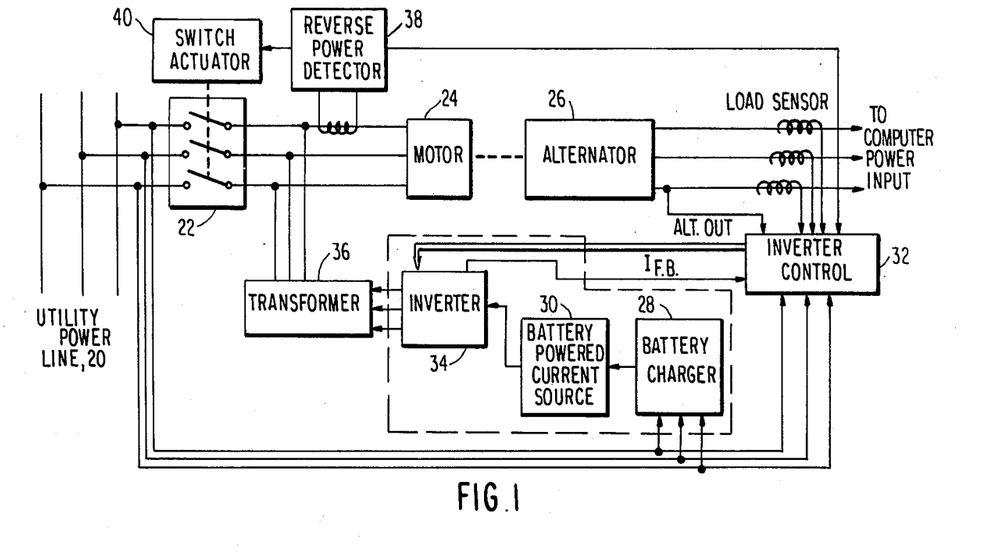
FIG. 1 is a schematic block diagram illustrating the present invention.

Referring now to the Drawings, wherein like reference numbers refer to like elements throughout the several views, FIG. 1 illustrates a three-phase utility power line 20 which normally provides power through switch 22 to a synchronous motor 24, which is mechanically connected to alternator 26. Simultaneously, the utility power line is connected to a battery charger 28, which maintains the charge level of batteries contained in a battery powered current source 30. Additionally, the utility power line has an input connected to the inverter control 32 which is utilized for synchronization purposes, as will be discussed later.

During normal operation, the contacts in switch 22 are closed and power is applied to the synchronous motor driving the alternator which provides the desired output. When utility power is interrupted, the motor/alternator rotating inertia assures uninterrupted power to the load until the inverter 34 begins powering motor 24 through transformer 36.

Upon loss of utility power, the excited field synchronous motor 24 (constructed in a manner similar to an alternator) naturally pumps power into the utility grid. This reverse flow of power is quickly detected by a reverse power detector 38 and within a few milliseconds, the motor is disconnected from the utility lines to conserve the rotational stored energy. This disconnection can be done with a switch 22 operated by actuator 40 or with static switches such as thyristors. In addition, a frequency detector can be used to disconnect the motor from the utility lines if the frequency of the rotating motor/alternator set decreases to 59 Hz.

With the motor disconnected from the utility lines, the inverter system which had not been operating, but merely standing by with its control energized, is now commanded to begin power circuit inversion using the battery as the power source. In a preferred embodiment, the inverter is of the current source type. This means that the current from the inverter can never, even instantaneously, exceed a predetermined maximum level. With a current source inverter, the inverter can be energized even while the switch 22 is in the process of opening. Typically, a switch or contactor takes 30 milliseconds to drop out and thus some rotational speed of the motor/alternator set is lost during that time.

Furthermore, it is necessary to bring the motor speed back up to the point at which the alternator produces a 60 Hz output. To obtain the best torque per ampere with the current source inverter/synchronous motor system, current must be inserted with the proper phase relationship to the motor field. The terminal voltage cannot be used to determine the position of the field because it is determined largely by the inverter output impressed upon it. Therefore, phase and frequency information are derived from the alternator output, or a miniature three-phase tachometer or synchronous generator is connected to the shaft between the motor and alternator (represented by the dotted line) to provide such a position signal.

Figure 2:
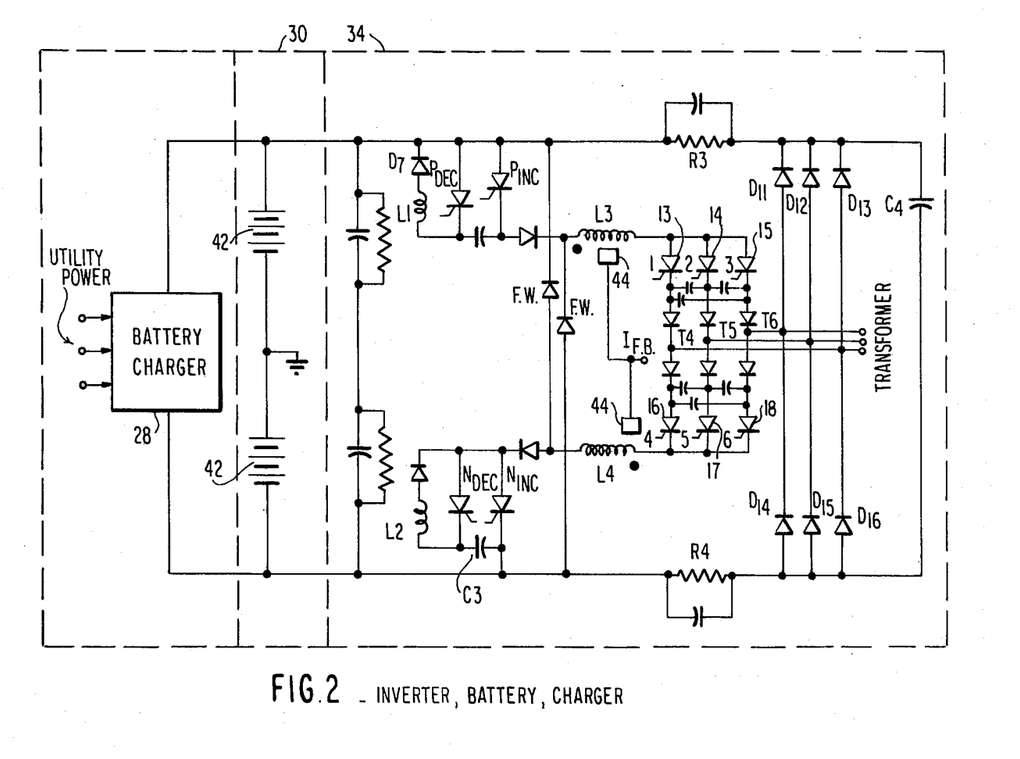
FIG. 2 is an electrical schematic diagram of the inverter/battery/battery charger portion of the present invention.

The inverter, battery and battery charger system shown in dotted line FIG. 1, can be more clearly seen in FIG. 2, wherein a three-phase, full-wave rectifier circuit constitutes battery charger 28. This feeds an output to batteries 42, making up the battery-powered current source 30. Such a full-wave rectifier is shown in FIG. 4 of U.S. Pat. No. 4,054,818, issued Oct. 18, 1979, to the present inventor. In the present case, the battery is sensitive to the charging voltage, and for that reason, a phase controlled 6 SCR bridge with a D.C. inductor could be substituted for the uncontrolled full-wave rectifier. Further, the output of the battery-powered current source 30 is connected to the input lines of a solid-state current source polyphase inverter induction motor drive circuit such as is also disclosed in the above-identified patent at FIG. 4. In fact, the inverter 34 of FIG. 2 in the present application is identical to the inverter disclosed in FIG. 4 in the aforementioned patent, and the output of the inverter drives an auto transformer 36, as previously discussed.

For the operation of a chopper-type polyphase inverter, the discussion relating thereto in U.S. Pat. No. 4,054,818 is herein incorporated by reference. The numbers identifying the various components in the above-numbers mentioned patent have been included on the same components in FIG. 2 of the present specification for clear consistence with the explanation contained in the above patent. It is noted that the switching devices, in this instance, SCR's, numbered 1 through 6, provide the phase angle of current supplied from the inverter to the motor, whereas SCR's labelled $P_{INC}$, $P_{DEC}$, $N_{INC}$, and $N_{DEC}$, determine the duty cycle, or amount of current provided by the inverter. These ten control inputs to the inverter are represented by the large arrow from inverter control 32 to the inverter 34 shown in FIG. 1 of the present application. They are derived from an inverter synchronization firing circuit shown in FIG. 6, which will be discussed later.

Figure 3:
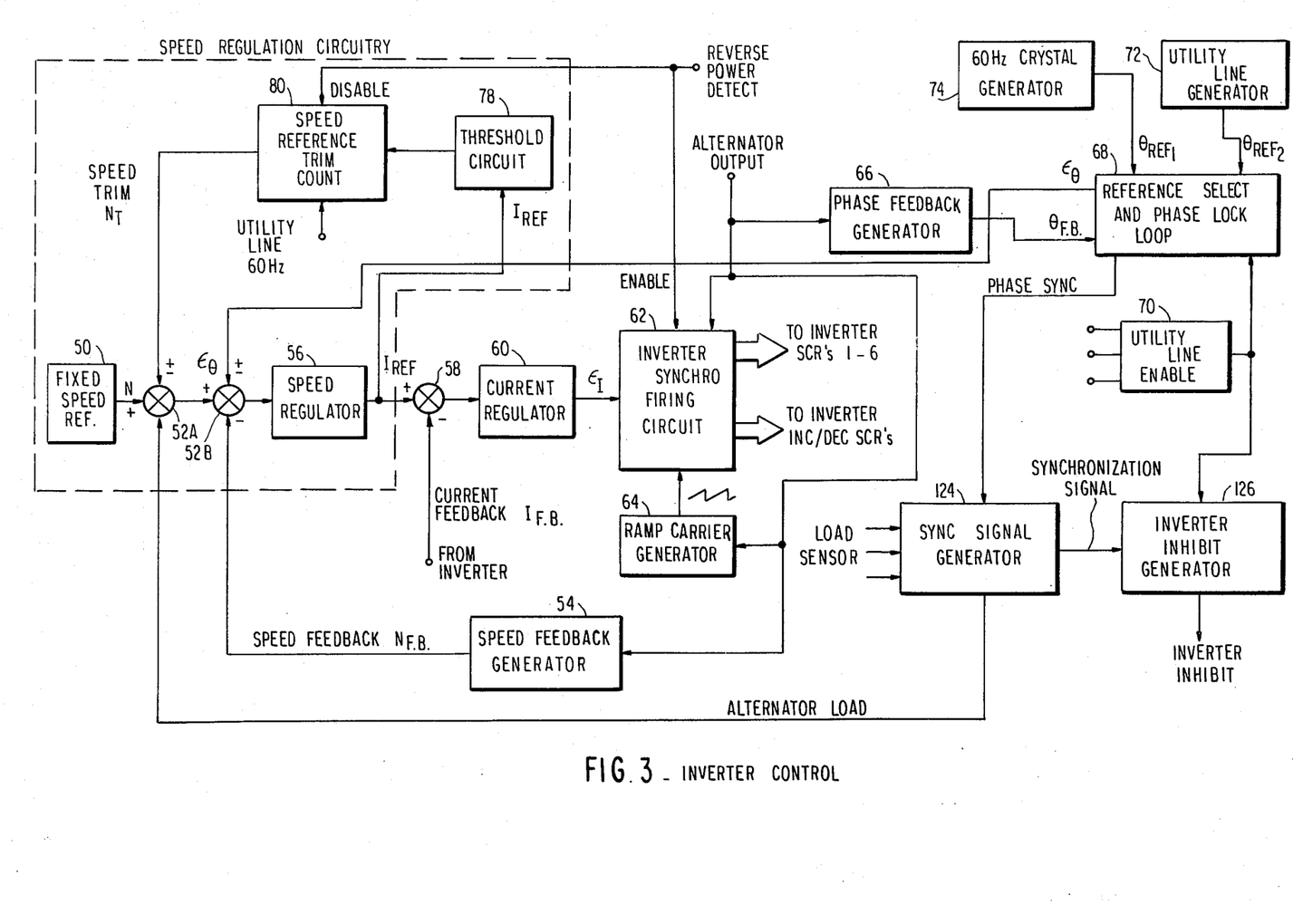
FIG. 3 is a schematic block diagram of the inverter control system in accordance with the present invention.

The inverter control circuit 32 is shown in block diagram form in FIG. 3. The speed regulation circuitry is outlined in the dotted line segment and is shown in detail in FIG. 4. A fixed speed reference may be a precision potentiometer/voltage divider network to provide an output indicative of the desired alternator rotational speed. This speed input N is provided to a summing junction 52A, where it is combined with a speed trim signal $N_T$. An additional summing junction 52B is shown, although both junctions are electrically the same point. Additional inputs to the summing junction 52 are a speed feedback signal $N_{FB}$ and a phase error signal $\epsilon_\theta$. The speed feedback signal can either be derived as previously noted from the alternator output or a miniature three-phase tachometer alternator connected to the alternator drive shaft. The speed feedback generator may be a one shot multivibrator which provides an average D.C. output signal whose voltage is proportional to the frequency of the alternator shaft. $\epsilon_\theta$ is a voltage representative of the phase error between the alternator phase and a reference phase, which can either be a crystal generated reference or a utility line generated reference. A D.C. signal derived by rectifying current transformers in the alternator output create a feed forward of load magnitude, and allows the system to react rapidly to load changes, i.e., the alternator load signal.

The sum of N, $N_T$, $N_{FB}$, alternator load, and $\epsilon_\theta$ are supplied as an input to speed regulator 56, as shown in FIG. 3. The output of the speed regulator circuit is a signal which we shall call current reference $I_{REF}$. This is summed in summing junction 58 with a current feedback signal $I_{FB}$ derived from the Hall devices 44 in the inverter circuit. As can be more clearly seen in FIG. 5, because $I_{REF}$ and $I_{FB}$ are of opposite polarity, the output from the summing amplifier of current regulator 60 will be a current error signal $\epsilon_I$. $\epsilon_I$ is supplied to an inverter synchronization firing circuit 62, which provides, in a preferred embodiment, firing pulses to the SCR's in the above-discussed inverter. The ramp carrier generator 64 is synchronized to 6 times the alternator output and provides a series of sawtooth pulses as shown to the chopper portion of the inverter synchronization firing circuit 62.

The phase feedback generator 66 provides a square wave phase feedback signal $\theta_{FB}$ from the alternator output and supplies this to the reference select and phase lock loop 68. The existence of an appropriate signal from the utility line enable 70 causes the reference select and phase lock loop block 68 to select the utility line generator 72 (during normal utility line operation) or the crystal generator 74 (for synchronization during utility line power interruptions). The phase feedback signal $\theta_{FB}$ is compared with either the crystal generated reference $\theta_{REF1}$ or the utility line generated reference $\theta_{REF2}$ and the phase error signal is applied to summing junction 52 as discussed earlier.

The current reference $I_{REF}$ which is derived from speed error as described, is also fed to a threshold circuit 78 where it is compared to a specific voltage (2 Volts is preferred). The output of threshold circuit 78 is applied to a speed reference trim counter 80, enabling it to count up and/or down at a 60 Hz input unless disabled by a signal from the reverse power detector 38. In the standby mode, the inverter system is thereby automatically maintained in a condition of readiness. With the rotating motor/alternator set known to be at 60 Hz with utility power connected to it, the speed reference in standby is trimmed continually to keep the output of the speed regulator at a level corresponding to a balance between speed reference and speed feedback. Thus, long term drift of components in the speed regulator is automatically compensated for by the counter being required to trim the speed reference and keep the speed regulator output in its active regime. By maintaining a 2-Volt actuating error in the standby mode, the speed regulator is not only assured of having a properly trimmed speed reference, but also has no delay time in developing a current reference when called upon to quickly power the motor. Two volts corresponds to somewhat more than the no-load motor current, i.e., 50 percent load current.

Thus, as can be seen, the major speed control is provided by the speed reference and feedback signals N, $N_T$ and $N_{FB}$, and, when called upon, will maintain alternator shaft speed within one percent. The phase feedback signal $\epsilon_\theta$ serves only to modify the speed until the phase of the alternator output is synchronized with the selected input phase $\theta_{REF1}$ or $\theta_{REF2}$. The speed trim signal $N_T$ serves as an output from a "long term drift monitor" to insure that the speed system maintains its accuracy for twenty or more years, despite the aging of components in the fixed speed reference 50, summing junction 52, speed feedback generator 54, speed regulator 56, summing junction 58, and current regulator 60.

A more detailed discussion of the operation of the blocks in the inverter control circuit follows with reference to the detailed circuit diagrams.

Figure 4:
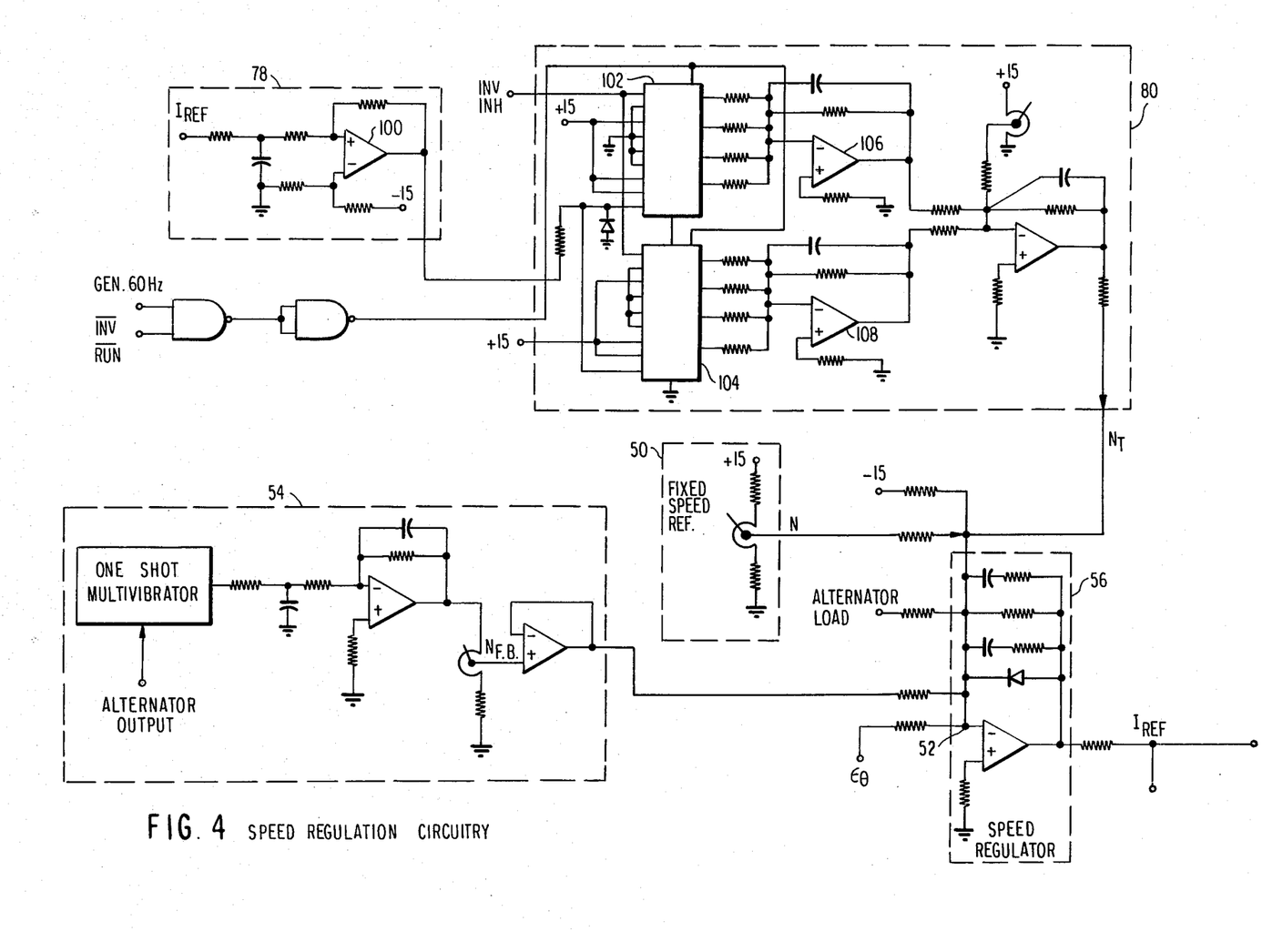
FIG. 4 is an electrical schematic diagram of the speed regulation circuitry shown in the dotted line portion of FIG. 3.

The actual speed regulation circuitry outlined by the dotted lines in FIG. 3 is shown in FIG. 4. The fixed speed reference 50 may comprise a precision potentiometer providing speed reference signal N to summing junction 52. The speed trim signal $N_T$ and the speed feedback signal $N_{FB}$ are also supplied to this point. The speed regulator 56 comprises the operational amplifier shown with a transformer function set by the components listed. The output $I_{REF}$ is used not only to derive speed trim, but is also provided to the current regulator and the rest of the inverter control as shown in FIG. 3. We defined the UPS system as being on "stand-by" when the utility system is providing power in the normal manner and on "operate" when the utility power has been interrupted.

In the stand-by mode, the synchronous motor 24 is empowered by the utility line power. The alternator is rotating at its rated speed and thus $N_{FB}$ will be present. The speed regulator circuitry is active, even though the inverter is not yet operating. A summing operational amplifier indicates to the two stage 256 count counter 102 and 104 a signal to begin either counting up or counting down at the 60 Hz rate of the input clock signal. If $I_{REF}$ exceeds the desired 2-Volt level, the up-down count command will reverse and the counter will count down. Whichever direction the counter counts, its output is read out through the ladder network into summing operational amplifiers 106 and 108 to provide the speed trim signal $N_T$. The amplifier values are chosen such that the counter will continuously dither up and down a count or two when the UPS is in the stand-by mode in order to maintain $I_{REF}$ at its desired value. Thus, the speed regulator is set at a speed reference that balances the feedback signal $N_{FB}$ while the synchronous motor is actually being driven by the line current. Thus, if component values change due to the aging or temperature changes, the counter will merely count up or down a few counts so that the reference will remain perfect, even after several years.

If the utility line power is interrupted, the 60 Hz input is inhibited and the counter holds its count at that point. However, the reference select and phase lock loop 68 will supply any slight speed changes necessary to insure synchronization of the speed regulation circuitry with the 60 Hz crystal generator 74. When the utility power comes back on line, the reference select and phase lock loop 68 changes to compare the alternator phase feedback signal $\theta_{FB}$ with a 60 Hz square wave derived from the utility line $\theta_{REF2}$ and the synchronous motor speed is adjusted until it is in sync with the utility line phase. Once in sync, the switch 22 would be closed and subsequently the phase lock loop disabled and the up-down counter re-enabled. As will be apparent from reviewing the circuitry, the 3-phase alternator output applied to the one shot speed feedback generator 54 is filtered and scaled before being applied to the summing junction 52.

Figures 5, 6, 7, 8:
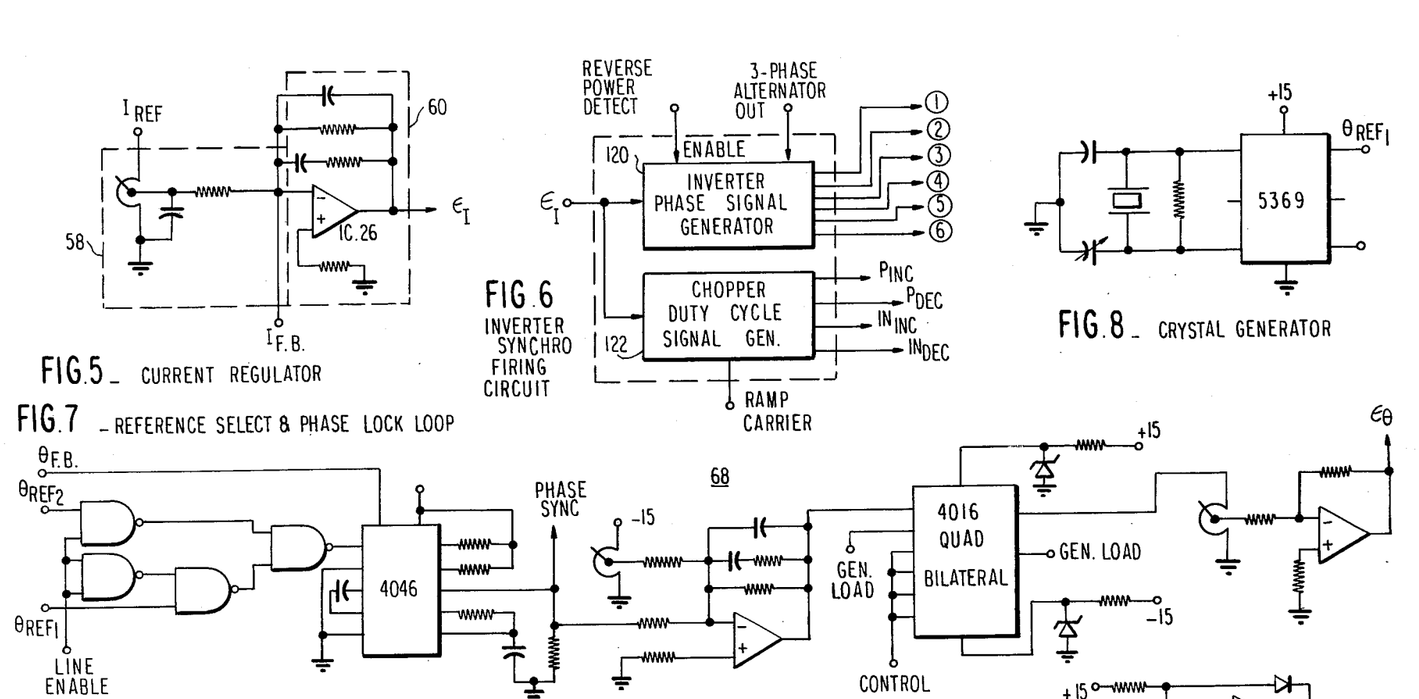
FIG. 5 is an electrical schematic of the current regulator shown in FIG. 3.
FIG. 6 is a block diagram showing the inverter synchronizing firing circuit disclosed in block diagram form in FIG. 3.
FIG. 7 is an electrical schematic of the reference select and phase lock loop block disclosed in FIG. 3.
FIG. 8 is an electronic schematic of the crystal generator block disclosed in FIG. 3.

$I_{REF}$, as can be seen in FIG. 5, is supplied through the potentiometer and resistor to summing junction 58 which is inputted to the summing amplifier of current regulator 60 at pin 14. As previously discussed, $I_{FB}$ is also applied to this point and because they have opposite polarity, the current error signal $\epsilon_I$ will be provided at the output of the amplifier as shown.

$\epsilon_I$ is applied to the inverter synchronization firing circuit as shown in FIG. 6. The firing circuit comprises an inverter phase signal generator 120 and a chopper duty cycle generator 122, whose outputs are connected to the firing circuit of the inverter switches; in this embodiment, the previously discussed SCR's. An additional input to the inverter phase signal generator 120 is the alternator output, and $\epsilon_I$ is utilized to intercept cosine waves, derived from the three alternator sine waves, to determine the firing point of the SCR's (and thus, the point of insertion or phase angle of current into the synchronous motor). The three-phase alternator output also is processed to create a 6 $F_O$ reset signal sent to the ramp carrier generator 64 to sync it and this ramp signal is applied to the chopper duty cycle signal generator 122.

The extent to which the signal amplitude of the ramp carrier exceeds $\epsilon_I$ determines the duty cycle of the chopper and thus the current supplied by the inverter. While the chopper duty cycle signal generator 122 continuously provides firing signals to $P_{INC}$, $P_{DEC}$, $N_{INC}$, $N_{DEC}$, the inverter phase signal generator 120 does not provide firing signals to SCR's 1 through 6 unless it is enabled with a signal from the reverse power detector. The ramp carrier frequency is generally six times the frequency of operation ($F_O$) of the UPS system. The ramp is always reset at 6 $F_O$, unlike the motor drive system described in the aforementioned patent, which changes chopper frequency to various multiples of $F_O$, such as 92, 48, 24, 12, as well as 6 $F_O$. This is because in the present instance UPS will always be close to rated speed and the 6 $F_O$ frequency would normally be selected in the previous system when near full speed.

A more detailed electrical schematic of the reference select and phase lock loop 68 is shown in FIG. 7. The line enable indicates to the reference select logic whether there is utility line power available or not. If the power is available, phase is set to the square wave derived from the utility line power by utility line generator 72 with said signal designated as $\theta_{REF2}$. However, where there is no utility line power available, the system adjusts the phase to a reference signal provided by the 60 Hz crystal generator 74, said reference signal designated as $\theta_{REF1}$.

Whichever reference is selected, it is compared with a square wave signal $\theta_{FB}$ generated in the phase feedback generator 66 which is directly related to the alternator output phase. The position error signal out of the phase locked loop chip is stabilized by a lead/lag network and passed through a quad bilateral switch. The switch is utilized so that the signal can be cut-off during the standby mode and passed during the inverter operate mode. The output is then scaled with the 5K potentiometer and the operational amplifier and passed to the summing junction 52 of the speed regulation circuitry. This phase lock loop circuit only has the ability to vary the speed slightly (approximately ±1%). The gain of the operational amplifiers are set such that with the motor at 60 Hz with no speed error, the position error (i.e., the phase error between the actual alternator output and the reference output) is approximately 10 degrees from no load to full load conditions.

Figure 9:
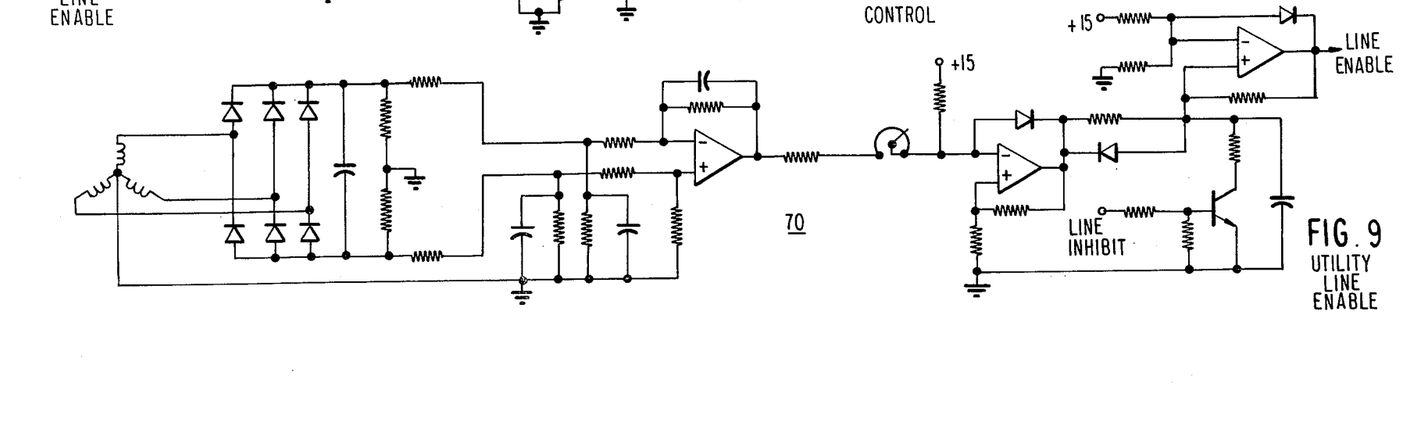
FIG. 9 is an electrical schematic of the utility line enable block shown in FIG. 3.

When and if utility line power comes back on line, it will be sensed by the full wave bridge rectifier shown in the left-hand portion of the utility line enable schematic shown at FIG. 9. Only if the utility line power remains up for several seconds will the line enable output be produced. If, at any time during the several second review of utility line power, the voltage drops or is interrupted, the 50 $\mu fd$ capacitor is quickly discharged through the transistor connected across it and must begin charging all over again.

Figure 11:
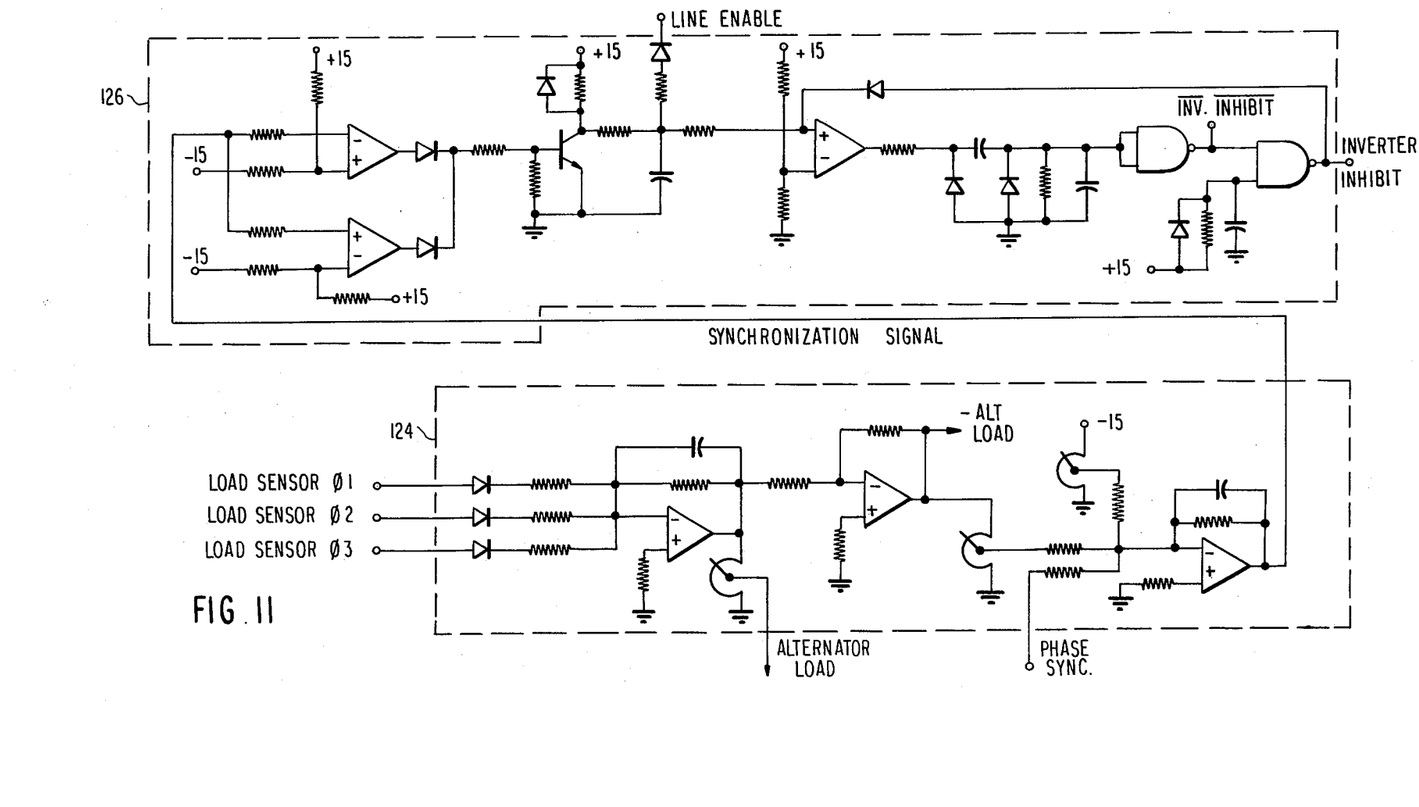

When the utility power has been up for more than several seconds and the line enable output has gone high, the reference select and phase lock loop 68 will begin comparing the output of phase feedback generator 66 with utility line generator output $\theta_{REF2}$. With the line enable high, an alternator load signal, a bias signal, and a phase sync signal (from the reference select and phase lock loop 68) are compared in the sync signal generator 124 shown in FIG. 11 and when $\theta_{REF2}$ and $\theta_{FB}$ are closely synchronized, a synchronization signal goes low.

This synchronization signal is supplied to the inverter inhibit generator 126. When the inverter inhibit generator 126 is supplied with both the synchronization signal and a line enable input, the 50 $\mu fd$ capacitor will begin charging. When it is nearly charged, a one shot multivibrator will provide a one shot high on the inverter inhibit bus, disabling the inverter and re-enabling the speed reference trim counter 80.

The inverterinhibit output goes low for the one shot period and is supplied to the reverse power detector for the purose of locking out any reverse power detection for a brief period. This is desirable in order to prevent light loads from creating a variation in the motor torque angle when the motor is reconnected to the utility line. This slight rocking may falsely indicate a reverse power flow and the approximate one-second lock-out provides a suitable damping period. During the one-second time period that the inverterinhibit/ is low, the inverterrun/ goes high. This causes the output transistor in the reverse power detector (FIG. 10) to begin conducting causing switch actuator 40 to close the contacts of switch 22, reconnecting the motor to the line. The inverter is still operating at this point and both the utility line and the inverter feed the motor in order to prevent its losing speed or phase while the switch contactors are being closed.

Figure 10:
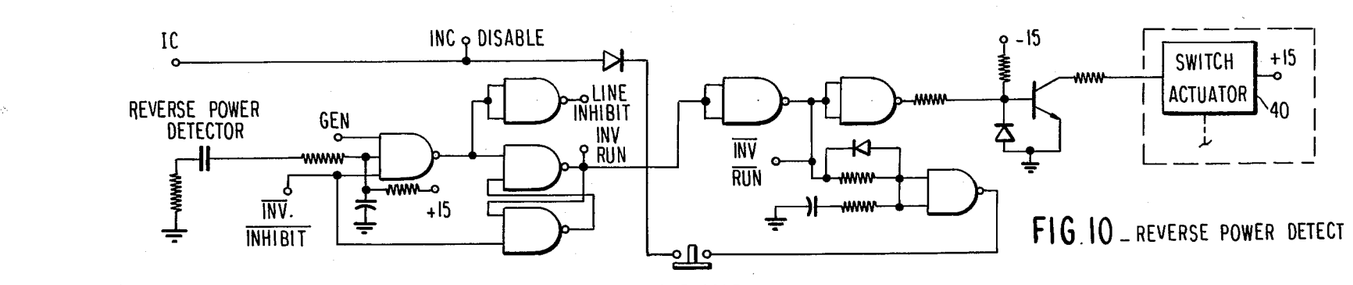
FIG. 10 is an electrical schematic of the reverse power detect block shown in FIG. 1; and, FIG. 11 is an electrical schematic of the synchronization signal generator block shown in FIG. 3.

The reverse power detector provides an INC disable output which disables the $P_{INC}$ and $N_{INC}$ SCR's of inverter 34 after a several second delay.

Although the UPS system has been described with reference to a preferred embodiment, in view of this disclosure, many modifications and applications of the device will be obvious to one of ordinary skill in the art. As noted earlier, the inverter described in U.S. Pat. No. 4,054,818 could be modified by eliminating the clamp resistors and the diode and capacitor in parallel with each clamp resistor. A diode would be added in inverse parallel with the INC SCR's and the air core commutating inductor would be in series with the commutating capacitor. The series diode would be eliminated and an SCR instead of a diode would be used in parallel with the DEC SCR's.

These changes improve the efficiency and reduce the peak voltage on the FW diodes allowing the output voltage to the motor to be slightly higher than before. It can be seen that changes to the current source inverter such as described above could be made without affecting the beneficial aspect of the present invention. Furthermore, a voltage source could be utilized with a pulse width modulated inverter or with a chopper to get variable voltage followed by an inverter. Obviously, the switches in either a current or a voltage source inverter, could be transistors, gated turn-off devices (GTO's), or SCR's, as shown. Thus, many modifications and variations of the present invention will be readily apparent to those of ordinary skill in the art by reference to the above disclosure. Therefore, the present invention is limited only by the claims appended hereto.

What is claimed is:

1. An uninterrupted power source system for providing power from a utility line during normal operation (stand-by mode) and from a stored power system during interruptions in utility power (operate mode), said uninterrupted power source system comprising:
   alternator means for generating a power output;
   motor means for driving said alternator means at a speed whereby said power output may be generated, said motor means being responsive to power from said utility line during said standby mode and to power from said stored power system during said operate mode, to drive said alternator means;
   said stored power system comprising:
   current source means having an output connected to said motor means, for powering said motor means;
   reverse power detecting means for providing an indication that power is flowing from said motor means into said utility power line;
   switch means, responsive to said reverse power indication, for interrupting the power flow between said motor means and said utility power line; and
   means, responsive to said current source means output and said alternator means output, for controlling power characteristics of said current source means output.

2. An uninterrupted power source system in accordance with claim 1, wherein said current source means comprises:
   battery means for storing power; and
   inverter means, connected to said motor means, for converting said battery power to an output suitable for powering said motor means and said controlling means is responsive to the power characteristics of said inverter means output.

3. An uninterrupted power source system in accordance with claim 2, wherein said controlling means comprises:
   means, responsive to said alternator power output, for providing a phase error signal $\epsilon_\theta$ indicative of any error in alternator output phase as compared with a reference phase;
   speed regulation means, responsive to said alternator power output, said reverse power detecting means and said phase error signal, for providing a current error signal $\epsilon_I$ as an output; and
   inverter trigger means, responsive to said alternator power output, said reverse power detecting means and said current error signal $\epsilon_I$, for triggering said inverter means in order that said phase error signal is minimized.

4. An uninterrupted power source system in accordance with claim 3, wherein said phase error signal providing means comprises:
   first reference means for generating a constant frequency output $\theta_{REF1}$
   second reference means for generating a utility power line frequency output $\theta_{REF2}$; and,
   means, responsive to said utility power, for selecting said first reference means output when said utility power is interrupted and for selecting said second reference means output when said utility power is not interrupted, for comparing the selected reference means output with said alternator power output, and for providing said phase error signal indication of any phase error between said alternator power output and said selected reference means output.

5. An uninterrupted power source system in accordance with claim 3, wherein said speed regulation means comprises:
   means for generating a fixed speed reference signal N;
   means, responsive to said alternator power output, for generating a speed feedback signal $N_{FB}$;
   speed regulator means for summing said fixed speed reference signal N, said speed feedback signal $N_{FB}$ and said phase error signal $\epsilon_\theta$ and for providing a current reference signal $I_{REF}$ output;
   means, responsive to said inverter, for generating a current feedback signal $I_{FB}$; and
   current regulator means for summing said speed output $I_{REF}$ and said current feedback signal $I_{FB}$ and for providing a current error signal $\epsilon_I$ output.

6. An uninterrupted power source system in accordance with claim 3, wherein said inverter includes increase/decrease SCR's and inverter SCR's and said inverter trigger means comprises:
   means, responsive to said current error signal $\epsilon_I$, said reverse power detecting means and said alternator power output, for generating inverter phase signal outputs for said inverter SCR's;
   means, responsive to said alternator power output, for generating a ramp carrier signal; and
   means, responsive to said ramp carrier signal and said current error signal $\epsilon_I$, for generating a chopper duty cycle signal for said increase/decrease SCR's.

7. An uninterrupted power source system in accordance with claim 4, wherein said phase error signal providing means further includes:
   means, responsive to said alternator power output, for generating a phase feedback signal $\theta_{FB}$ in the form of a square wave and for supplying the phase feedback signal $\theta_{FB}$ to said selecting, comparing and providing means;
   said selecting, comparing and providing means further including means for generating a phase sync signal indicative of synchronization between said selected reference means output and said phase feedback signal $\theta_{FB}$;
   said phase error signal providing means further including:
   means, responsive to said utility power, for providing a line enable signal to said selecting, comparing and providing means;
   means for providing an output indicative of a sensed alternator load;
   means, responsive to said phase sync signal and said alternator load output, for providing an alternator load signal to said speed regulation means and for providing a synchronization signal; and
   means, responsive to said synchronization signal and said line enable signal, for providing an inverter inhibit signal to the inverter if and only if the synchronization signal and said line enable signal are both present for a predetermined period of time.

8. An uninterrupted power source system in accordance with claim 5, wherein said phase error signal providing means includes means for providing an alternator load signal and said speed regulator means includes means for summing said alternator load signal with said fixed speed reference signal N, said speed feedback signal $N_{FB}$, and said phase error signal $\epsilon_\theta$ and provides said current reference signal $I_{REF}$ output based thereon.

9. An uninterrupted power source system in accordance with claim 8, wherein said speed regulation means further includes:

means, responsive to said reverse power indication, said current reference signal $I_{REF}$ and said utility line power, for providing a speed trim signal $N_T$, said speed trim signal comprising a variable speed trim signal when said reverse power indication is not present and a fixed speed trim signal when said reverse power indication is present, said variable speed trim signal comprising an indication of whether said current reference signal $I_{REF}$ is greater or less than a predetermined reference and said fixed speed trim signal comprising the variable speed trim signal fixed at the time of a reverse power indication and maintained until utility line power has been restored; and said summing means comprises means for summing said fixed speed reference N, said speed feedback signal $N_{FB}$, said phase error signal $\epsilon_\theta$, said alternator load signal, and said speed trim signal $N_T$, and for providing a current reference signal $I_{REF}$ output based thereon.

* * * * *